(No Model.)
J. D. MATTISON.
ROLLER BEARING.
No. 533,658. Patented Feb. 5, 1895.
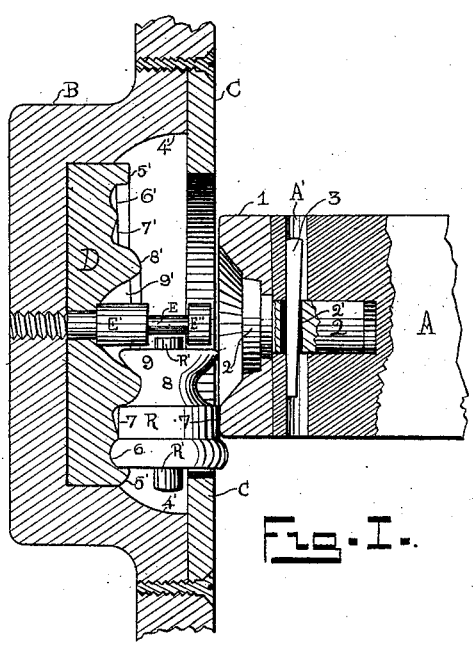
Fig. I.
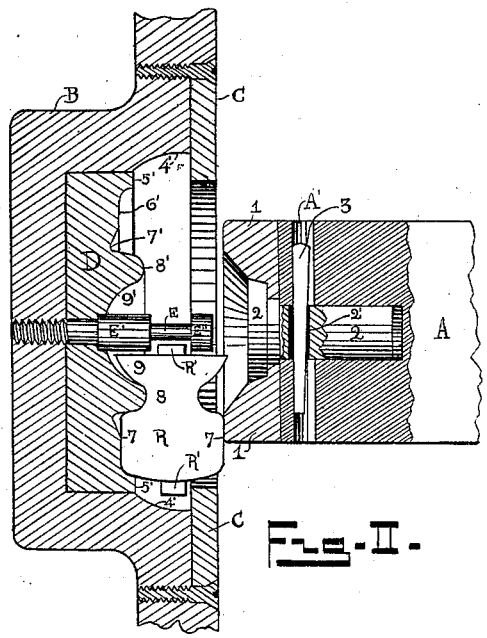
Fig. II.
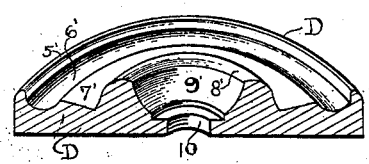
Fig. III.
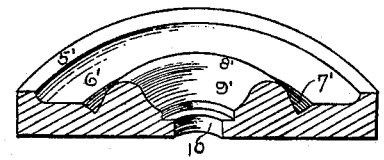
Fig. IV.
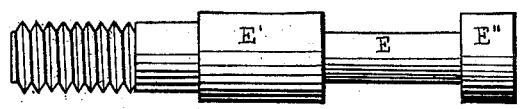
Fig. V.
WITNESSES:
INVENTOR
James D. Mattison
BY
ATTORNEY
THE NORRIS PETERS CO., PHOTO-LITHO., WASHINGTON, D. C.

UNITED STATES PATENT OFFICE.

JAMES D. MATTISON, OF SAGINAW, MICHIGAN.

ROLLER-BEARING.

SPECIFICATION forming part of Letters Patent No. 533,658, dated February 5, 1895.

Application filed January 12, 1894. Renewed January 4, 1895. Serial No. 533,831. (No model.)

*To all whom it may concern:*

Be it known that I, JAMES D. MATTISON, a citizen of the United States, residing at Saginaw, in the county of Saginaw and State of Michigan, have invented certain new and useful Improvements in Roller-Bearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to roller bearings for journals or axles, and is an end roller, and its track, forming the bearing for the journal head; and the invention consists in the peculiar form given to the roller and its track, whereby the journal is run with less friction, binding, and consequent heating, and abrasion, than other forms of roller bearings in use.

My invention relates to the same class of roller bearings described in my application, Serial No. 497,916.

Figure I is a section through the core of the journal and box. Fig. II is a similar section showing different form of roller. Fig. III is a section in perspective of the roller track disk in Fig. I. Fig. IV is same view of the disk in Fig. II. Fig. V is the center pin.

In the drawings, A, is the axle or journal, having a head 1, of hardened steel, the exposed end being straight.

2, is a core pin passing through the head piece 1, having shoulders engaging counters in the head piece, and entering the head of the journal.

A key 3, passing into a slot A' in the journal engages a slot 2' in the core pin 2, thereby firmly securing the head piece 1, on the journal A.

Of course any other well known mechanical means may be used to secure the head piece 1 to the journal.

B, is the head of the boxing and is adapted to receive the disk D, of hardened steel, which may be secured to it by the pin E through the central hole 10 of the disk D, as illustrated, or by other means. The exposed edge of this head is cut concave, as 4', as will hereinafter appear.

C, is a plate secured on the inside of the box head B, and holds the roller R, within its track.

R, is the roller forming the end bearing for the journal A, its track being the end of the journal and the disk D, and is held by means of bosses R', on each end of the roller, engaging when out of plumb, one of the collars E' or E'' on the pin E, and the collar C on the box B. 9 is a head on the inner end of the roller and fits into a corresponding groove, 9', in the disk D, and keeps the roller in radial line to its track. This is an essential feature of my invention.

Heretofore it has been common to so form an end roller that the bearing of the end of the journal will be upon a curved or beveled surface of the roller. In the drawings I have shown a roller having a straight peripherical surface for the bearing for the end of the journal, 7, and this feature is a part of my invention.

In Figs. I and II, I show a roller R, whose periphery where engaged by the end of the journal 1, is straight and parallel with the axis of the roller. This forms the bearing for the journal head.

Upon the exposed surface of the hardened steel disk D, in the head of the box, I form the track or bearing for the roller R. These tracks, 6', 7', 8', and 9', conform to the shape of the roller R, except opposite the surface 7 where the track is concave, 7', and does not engage the straight surface, 7, of the roller.

At the outer end of surface 7, of the roller, in Fig. I, I enlarge the roller, forming what appears to be a convex collar, 6. This convex collar 6, travels in a concave groove, 6', in the disk D, near the outer edge, 5', of the disk. At the inner end of surface 7 on the roller R, is a deep groove, 8, the inner edge of the groove being the edge of the head 9, of the roller.

Fig. II is another form of the roller having a straight periphery, not only for the journal bearing on the roller, but also when the lower end of the roller bears against the disk.

It will be observed that a line drawn from the middle of the convex curve 6, to the center of the circle described by the roller on its track will pass through the extreme depth of the groove 8, so that the bearing or track of the roller will be in conical line with the axis of the roller.

It will be observed that the bearings of the roller in its track are on curved surfaces, the lower bearing being in a concave surface, 6', of the disk, the upper bearing being on a convex surface, 8', of the disk, thus securing a positive radial movement of the roller in its track, and preventing any undue strain or end push of the journal throwing it out of line, thereby causing binding, abrasion, and heat. The pin E previously mentioned here answers two purposes, viz: to hold the steel disk in its place, and by the collars E' and E'' prevent the roller from getting out of its track. It is obvious that the latter purpose could be accomplished by a lug in the center of, and integral with, the disk D, and provided with the collars E' and E''. This I claim the right to do.

One of the essential features of my invention is the head on the inner end of the roller, as it prevents the roller from getting displaced so as to turn endwise on its course or to be forced outward by the wedge shaped action, thus destroying its durability and usefulness.

The other essential feature of my roller is a roller so constructed as to travel in its tracks as to have a bearing or track on each side of the journal bearing surface with the journal bearing surface straight, thus preventing any end thrust from displacing the roller.

It will be observed that the track for the roller and the roller itself, could be made with other and different curved surfaces aside from the straight surface or track for the journal end. Therefore any change may be made in its peripheral form aside from the straight bearing surface for the journal without departing from the principle of my invention. Therefore,

Having thus described my invention, what I claim as new, and desire to secure by Letters Patent, is—

1. In a roller end bearing for journals, a roller engaging the end of the journal and the roller track, the roller having a head formed upon its inner end, the peripherical surface of the head being free and out of engagement with either the journal end or roller track, substantially as and for the purpose set forth.

2. In a roller bearing for the ends of journals, the combination with a roller having a head formed upon its inner end beyond the journal end bearing surface on the roller and having the bearing for the end of the journal straight and parallel to the axis of the roller, the remainder of the periphery of the roller being curved and beveled and adapted to move in corresponding curves and bevels in the roller whereby the roller may be kept in radial line, of the roller track, substantially as specified.

3. In a roller bearing for journal ends, the combination with a journal having an end piece of hard steel, and the boxing, of a roller engaging the end of the journal, the roller engaging surface being straight and parallel to the roller axis, a plate of hardened steel rigidly secured in the box head, the end plate having its exposed surface beveled and curved and grooved and adapted to form the track of the roller, substantially as and for the purpose set forth.

4. In a roller bearing for journal ends, the combination, with the journal having an end piece of hard steel and the boxing, of a roller having a straight surface parallel to the line of the roller axis and engaging the journal end and having its periphery outside the journal bearing convex and inside concave, and forming a head on the inner end of the roller, and a hard steel plate in the box head, its exposed surface forming the track for the roller by being curved and grooved and beveled to receive only the curves and grooves of the roller, and not engage the straight surface of the roller, whereby the journal bearing on the roller will be between the bearings of the roller on its track, substantially as described.

5. In a roller bearing of the class described, the combination with the boxing and journal having an end piece of hard steel, of a roller having a portion of its surface straight and parallel to its axis, the remaining surface of the roller being curved and grooved, and a plate of hardened steel in the box head having on its exposed surface the track for the roller, consisting of grooves and curves corresponding to the curves and grooves upon the roller, whereby the surface of the roller forming the journal bearing may be intermediate of the roller bearings on its track, and the pin E in the center of the plate provided with collars on each side of the axis of the roller and the bosses R' on the ends of the roller, substantially as described.

6. In a roller bearing of the class described, the combination with the boxing, and the journal having an end piece of hardened steel, of a roller engaging the end of the journal with a straight peripherical surface parallel to the line of its axis, and having outside and inside this journal bearing a curved and grooved periphery, and a head upon its inner end, and having at each end the bosses R' and a plate of hardened steel secured in the box head, having its inner surface formed by grooves and curves, to receive the roller and its head and form its tracks, the tracks of the roller being each side of and opposite to the journal bearing surface on the roller, and the pin E, having collars E' and E'' on each side of the boss R', and the collar plate C, for securing the roller in its track, substantially as described.

7. In a journal end roller bearing, the combination with the roller described of a plate of hardened steel secured in the box head and having its exposed surface grooved and curved and beveled, and adapted to receive the curved and grooved and beveled surfaces respectively of the roller and roller head, and having a grooved surface opposite the journal bearing on the roller, whereby the journal bearing will be intermediate of the bearings of the roller on its own track, substantially as and for the purpose set forth.

In testimony whereof I affix my signature in presence of two witnesses.

JAMES D. MATTISON.

Witnesses:
J. F. O'KEEFE,
A. H. SWARTHOUT.